United States Patent [19]
Kondo

[11] Patent Number: 5,943,785
[45] Date of Patent: Aug. 31, 1999

[54] CURVE LENGTH MEASURING APPARATUS HAVING CASTER

[76] Inventor: Rie Kondo, 4-19-23, Higashiikuta, Tama-ku, Kawasaki-shi, Kanagawa-Prefecture, Japan

[21] Appl. No.: 08/933,060

[22] Filed: Sep. 18, 1997

[30] Foreign Application Priority Data

Oct. 4, 1996 [JP] Japan .................................. 8-296994

[51] Int. Cl.⁶ .............................. G01B 3/12; G01B 9/00
[52] U.S. Cl. ............................................... 33/773; 33/780
[58] Field of Search ..................................... 33/1 N, 1 PT, 33/27.01, 706, 707, 709, 772, 773, 775, 779, 780, 781, 782

[56] References Cited

U.S. PATENT DOCUMENTS

| | | | |
|---|---|---|---|
| 1,835,804 | 12/1931 | Morra | 33/781 |
| 3,494,039 | 2/1970 | Porter | 33/773 |
| 3,577,918 | 5/1971 | Wayfield | 33/782 |
| 3,696,510 | 10/1972 | Evans, Jr. | 33/781 |
| 5,062,063 | 10/1991 | Shimizu | 33/773 |
| 5,067,249 | 11/1991 | Terrigno | 33/781 |
| 5,161,313 | 11/1992 | Rijlaarsadam | 33/780 |
| 5,780,846 | 7/1998 | Angilella et al. | 33/780 |

*Primary Examiner*—G. Bradley Bennett
*Attorney, Agent, or Firm*—Smith, Gambrell & Russell, LLP; Beveridge, DeGrandi, Weilacher & Young, Intellectual Property Group

[57] ABSTRACT

A handy type curve length measuring apparatus includes a pen-holder like body, a caster rotatably connected with the body so as to rotate around a rotation axis and having a disk including slits, light emitting device, light detecting device and an indicator. When the disk rolls on a curved line, the slits provided on the disk cross the beam of light emitted from the light emitting device so as to generate pulses. The light detecting device counts the number of these pulses and the indicator displays a length of the curve based on the number of detected pulses. Since the apparatus can trace curved lines without rotating the body due to the caster mechanism, an accurate and easy measurement of length can be attained.

19 Claims, 2 Drawing Sheets

CURVE LENGTH MEASURING APPARATUS HAVING CASTER

BACKGROUND OF THE INVENTION

1. Field of the Invention

The present invention relates to a curve length measuring apparatus and particularly to a pen-holder type curve length measuring apparatus having a caster mechanism so as to be able to trace an object curved line correctly and easily.

2. Prior Art

There are curve length measuring apparatuses used for measuring the length of curves on maps, drawings and the like. Generally, these apparatuses are characterized in being used readily like drawing with a pencil. Therefore, most of the apparatuses have such a simple construction as comprising a pen-holder like body, a rolling disk provided at the tip of the body and an indicator mounted on the body. The rolling disk is for detecting a length of a curved or straight line by rolling the disk along the curve or the line. Since an axis of the rolling disk is rigidly connected with the body, while an operator traces curves with the rolling disk, the operator has to continue to rotate the body in the tangential direction of the curve, so it is difficult to trace curves correctly whose direction changes complicatedly. Further, it is hard to read the indicator due to the ever rotating body. These difficulties lead to incorrect or erroneous measurement of the curve length.

SUMMARY OF THE INVENTION

Accordingly, the present invention is intended to obviate the disadvantages of the prior art, and it is an object of the present invention to provide a handy type curve length measuring apparatus capable of tracing curves correctly without rotating the body, i.e., with the body directed towards the operator so as to allow the operator to read the indicator easily.

In order to achieve the object, the present invention comprises: a caster rotatably connected with a body so as to rotate around a first axis of the caster; a rolling disk rotatably connected with the caster so as to rotate around a second axis of the rolling disk; a plurality of slits provided on the rolling disk along the outer periphery thereof; light emitting means for emitting a light; a condenser provided in the body for converging the light into a beam; a light guide element fixed to the caster with a center axis common to the first axis of the caster for transmitting the beam supplied from the condenser towards the front end thereof, the light guide element divided into a first front end portion and a second front end portion at the front end thereof; a first mirror provided in the first front end portion of the light guide element for receiving the beam transmitted through the light guide element and for reflecting the beam in the direction of the rolling disk; a second mirror provided in the second front end portion of the light guide element for receiving the beam passing through one of the slits and for reflecting the beam towards the rear end of the light guide element; a first light guide tube built in the light guide element with a rear end portion thereof provided on the center axis of the light guide element and with a front end portion thereof disposed in the second front end portion of the light guide element for collecting the beam reflected by the second mirror and for guiding the beam toward the rear end portion of the first light guide tube; an air gap provided between the rear end of the light guide element and the first light guide tube and the condenser; a second light guide tube provided on a center axis of the condenser for receiving the beam through the air gap and for guiding the beam in the rear direction of the body; light detecting means for detecting a pulse generated when the rolling disk rotates; pulse counting means for counting a number of the pulse and curve length indicating means for indicating a curve length based on the number of the pulse.

DETAILED DESCRIPTION OF THE INVENTION

Figure 1:
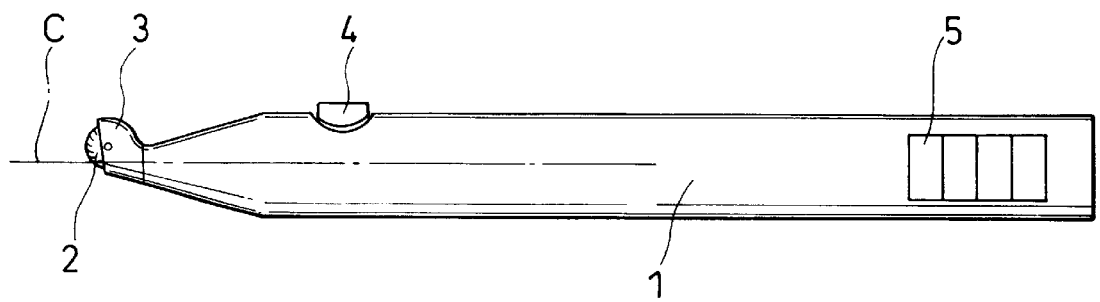
FIG. 1 is an overall view of a curve length measuring apparatus having a caster mechanism according to an embodiment of the present invention.

Referring now to FIG. 1, numeral 1 denotes a body having a pen-holder like configuration, numeral 3 denotes a caster rotatably connected with the tip (front end) of the body 1 so as to rotate around a center axis c thereof, numeral 2 denotes a rolling disk rotatably connected with the caster 3, numeral 4 denotes a power switch and numeral 5 is a liquid crystal display. An axis of the rolling disk 2 is connected with the caster 3 being offset by a length approximately equal to the radius of the rolling disk 2 from the center axis c of the body 1.

Figure 2:
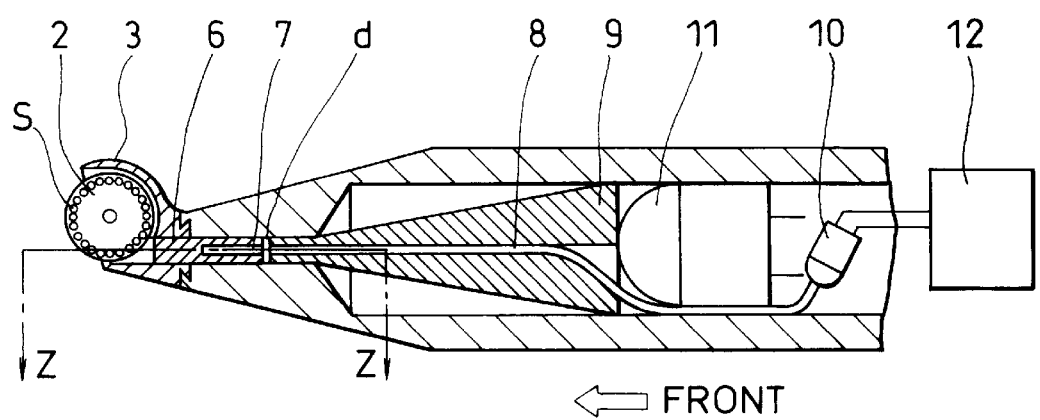
FIG. 2 is an enlarged sectional view showing a primary portion of a curve length measuring apparatus according to an embodiment of the present invention.
Figure 2A:
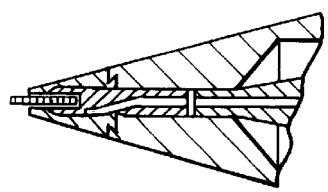
FIG. 2A is a sectional view taken along lines Z—Z in FIG. 2.

Referring to FIG. 2 and FIG. 2A, numeral 11 denotes a LED (light emitting diode), numeral 9 denotes a condenser for converging light emitted from the LED 11 into a beam, numeral 6 denotes a light guide element fixed to the caster 3 with a center axis thereof common to the center axis c of the caster 3 for guiding the beam received from the condenser 9 and numeral 10 denotes a photo-cell for detecting the pulse which will be described hereinafter.

The rolling disk 2 is made of a hard material such as bronze, iron and the like and has a plurality of slits s equally spaced along the outer periphery thereof. The distance between two adjacent slits is approximately equal to the width of the slit s. The diameter of the rolling disk 2 is preferably 5 to 8 millimeters and its thickness is around 0.5 to 0.8 millimeters.

Further, the light guide element 6 has a cylindrical configuration whose diameter is preferably 2 to 3 millimeter.

Figure 3:
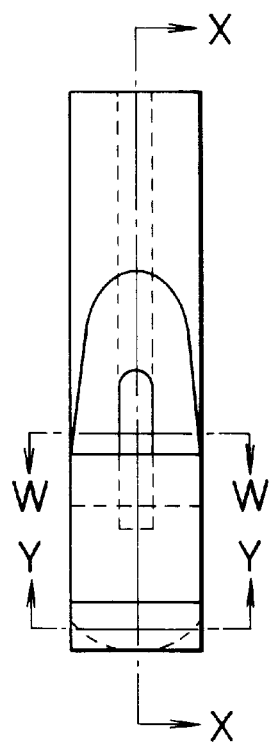
FIG. 3 is an enlarged sectional view showing a primary portion of a curve length measuring apparatus.
Figure 3A:
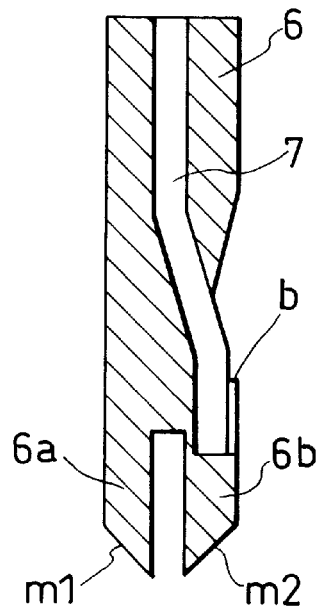
FIG. 3A is a sectional view taken along line X—X in FIG. 3.
Figure 3B:
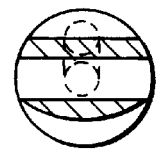
FIG. 3B is a sectional view taken along line Y—Y in FIG. 3.
Figure 3C:
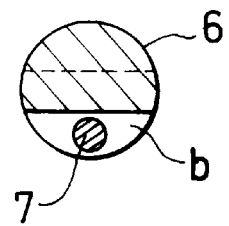
FIG. 3C is a sectional view taken along line W—W in FIG. 3.

Referring also to FIGS. 3 through 3C, numeral 7 denotes a first optical fiber tube 7 provided on the center axis of the light guide 6 for transmitting a light signal to the photo-cell 10 and numeral b denotes a light shutter provided on the light guide element for preventing surrounding light from coming into the first optical fiber 7.

The tip portion (front end) of the light guide element 6 is split into two tip portions 6a and 6b and the rolling disk 2 is disposed so as to rotate in a gap formed by the tip portions 6a and 6b. Further, the front end of the first optical fiber tube 7 is inserted into the tip portion 6b. Further, the first optical fiber tube 7 is partly exposed to outside at the light shutter b.

Further, a concave mirror m1 is provided at the tip portion 6a and a plane mirror m2 is provided at the tip portion 6b.

As shown in FIG. 2 and FIG. 3 and their associated sectional views, light emitted from the LED 11 is converged by the condenser 9. The converged beam is projected to the light guide element 6 through an air gap d formed by the front end of the condenser 9 and the rear end of the light guide element 6. Further, the beam goes through the light guide element 6 and is reflected by the concave mirror m1 orthogonally. The beam furthermore converged by the concave mirror m1 passes through one of slits s of the rolling disk 2 and is reflected by the plane mirror m2 again in the rear direction of the body 1. The beam is gathered at the end of the first optical fiber tube 7 and travels in the first optical fiber tube 7. The light shutter b acts to shut off the light flowing from the light guide element 6 into the optical fiber tube 7 and to prevent an irregular reflection of the beam.

When the rolling disk 2 rotates, the slit s moves and the beam is shut off by the rolling disk 2 between the mirrors m1 and m2. When the rolling disk 2 rotates further, the slit s appears to pass the beam. Thus, the rotation of the rolling disk 2 generates light pulses. That is to say, the number of pulses correlate to the traveling length of the rolling disk 2. These pulses are counted by a pulse counting means 12.

Further, a second optical fiber tube 8 is provided on the center axis of the condenser 9 which coincides with the center axis c of the body 1. Accordingly, the front end of the second fiber tube 8 and the rear end of the first fiber tube 7 face each other across the air gap d. Hence, the light signal is transmitted from the first optical fiber tube 7 to the second optical fiber tube 8. That is, the first optical fiber tube 7 is mechanically disconnected but optically coupled with the second optical fiber tube 8.

The second optical fiber tube 8 is connected at the rear end thereof with the photo-cell 10 so as to output the pulse signal to a counter (not shown) of the liquid crystal display 5. The number of pulse signals is counted in the counter and indicated on the liquid crystal display 5. In this embodiment, one pulse corresponds to one millimeter in the traveling length of the rolling disk 2. Alternatively, it is possible to display other numbers, for example, a distance between two points on a map calculated based on the scale factor.

In this embodiment, the mirror m1 is a concave mirror and the mirror m2 is a plane mirror, however, in the case where the beam is strong enough, the mirror may be a plane mirror. On the other hand, in the case where the beam is not strong enough, the mirror m2 may be a concave mirror, too.

In summary, according to the present invention, since it is possible to trace curves without rotating the body of the curve length measuring apparatus in the traveling direction, an easy and fast measurement of curve length can be achieved. Further because, the curve length measuring apparatus employs light transmitting means without using mechanical transmitting means or electrical wiring means, the construction becomes simple and therefore malfunctions can be largely reduced.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A curve length measuring apparatus having a penholder shaped body and a curve tracing mechanism connected with said body for measuring a length of a curve by tracing said curve, comprising:

a caster rotatably connected with said body so as to rotate around a caster axis, wherein the caster axis extends in a direction of a longitudinal length of said body;

a rolling disk rotatably connected with said caster so as to rotate around a disk axis oriented in a direction perpendicular to the caster axis, wherein an outer peripheral area of the rolling disk includes a plurality of slits, and the rolling disk engages the curve to be traced;

a light emitting system for radiating light onto a surface of the rolling disk; and a light detecting system for detecting light passing through the slits of the rolling disk, wherein a length of the curve being measured is determined based on the light detected by the light detecting system.

2. The curve length measuring apparatus according to claim 1, wherein
said rolling disk has a diameter ranging from 5 millimeters to 8 millimeters.

3. The curve length measuring apparatus according to claim 1, wherein
said rolling disk has a thickness ranging from 0.5 millimeters to 0.8 millimeters.

4. The curve length measuring apparatus according to claim 1, wherein a distance between said caster axis and said disk axis is approximately half of a diameter of said rolling disk.

5. The curve length measuring apparatus according to claim 1, wherein the light emitting system includes:

(a) light emitting means for emitting the light;

(b) a condenser provided in said body for converging said light into a beam;

(c) a light guide element fixed to said caster with a center axis common to said caster axis for transmitting said beam supplied from said condenser toward a front end of the light guide element, said light guide element being divided into a first front end portion and a second front end portion at the front end thereof; and (d) a first mirror provided in said first front end portion of said light guide element for receiving said beam transmitted through said light guide element and for reflecting said beam in a direction of said rolling disk;

and wherein the light detecting system includes:

(a) a second mirror provided in said second front end portion of said light guide element for receiving said beam passing through one of said slits and for reflecting said beam toward a rear end of said light guide element;

(b) a first light guide tube built in said light guide element with a rear end portion thereof provided on said center axis of said light guide element and with a front end portion thereof disposed in said second front end portion of said light guide element for collecting said beam reflected by said second mirror and for guiding said beam toward said rear end portion of said first light guide tube;

(c) a second light guide tube provided on a center axis of said condenser for receiving said beam from said first light guide tube and for guiding said beam in a rear direction of said body; and (d) light detecting means for detecting a pulse generated when light passes through the slits of the rolling disk when said rolling disk rotates;

wherein an air gap is defined between the first light guide tube and the second light guide tube, and wherein the curve length measuring apparatus further includes:

pulse counting means for counting a number of said pulses; and curve length indicating means for indicating a curve length based on said number of said pulses.

6. The curve length measuring apparatus according to claim 5, further comprising:

a light shutter provided in said light guide element for preventing said first light guide tube from being exposed to irregular reflection of light.

7. The curve length measuring apparatus according to claim 5, wherein said second mirror is composed of a plane mirror.

8. The curve length measuring apparatus according to claim 5, wherein said first mirror is composed of a plane mirror.

9. The curve length measuring apparatus according to claim 5, wherein said second mirror is composed of a concave mirror.

10. The curve length measuring apparatus according to claim 5, wherein said first mirror is composed of a concave mirror.

11. A curve length measuring apparatus, comprising:

a pen-holder shaped body;

a caster rotatably connected with the body so as to rotate around a caster axis;

a rolling disk rotatably connected with the caster so as to rotate around a disk axis, wherein an outer peripheral area of the rolling disk includes a plurality of slits, and the rolling disk engages the curve to be traced;

light emitting means for emitting a beam of light;

a light guide element provided with the caster for transmitting the beam from the light emitting means toward a first end of the light guide element, wherein the first end of the light guide element is divided into a first side portion and a second side portion;

a first mirror provided with the first side portion of the light guide element for receiving the beam transmitted through the light guide element and for reflecting the beam in a direction of the rolling disk;

a second mirror provided with the second side portion of the light guide element for receiving a pulse of light from the beam as the beam passes through one of the slits and for reflecting the pulse of light toward a second end of the light guide element located opposite the first end of the light guide element;

light detecting means for detecting pulses of light generated as the rolling disk rotates and light passes through the slits in the rolling disk;

pulse counting means for counting a number of pulses of light generated as the rolling disk rotates; and curve length indicating means for indicating a curve length based on the number of pulses counted.

12. The curve length measuring apparatus according to claim 11, wherein the caster axis extends along a longitudinal length of the body.

13. The curve length measuring apparatus according to claim 11, wherein the disk axis is oriented in a direction perpendicular to the caster axis.

14. The curve length measuring apparatus according to claim 11, wherein the light emitting means includes a condenser provided in the body for converging the light to form the beam.

15. The curve length measuring apparatus according to claim 14, further including:

a first light guide tube for transmitting the light reflected by the second mirror; and a second light guide tube for receiving the beam from the first light guide tube and for guiding the beam to the light detecting means;

wherein an air gap is defined between the first light guide tube and the second light guide tube and between the light guide element and the condenser.

16. The curve measuring apparatus according to claim 15, wherein the first light guide tube is provided in the light guide element.

17. The curve measuring apparatus according to claim 16, wherein the second light guide tube is provided on a center axis of the condenser.

18. The curve measuring apparatus according to claim 15, wherein the second light guide tube is provided on a center axis of the condenser.

19. The curve measuring apparatus according to claim 11, wherein the light emitting means and the light detecting means are spaced apart with respect to a longitudinal direction of the body.

* * * * *